United States Patent
Pontius

(10) Patent No.: US 8,194,790 B2
(45) Date of Patent: Jun. 5, 2012

(54) SPACED ONE-HOT RECEIVER

(75) Inventor: Tim Pontius, Crystal Lake, IL (US)

(73) Assignee: NXP B.V., Eindhoven (NL)

( * ) Notice: Subject to any disclaimer, the term of this patent is extended or adjusted under 35 U.S.C. 154(b) by 683 days.

(21) Appl. No.: 12/443,164

(22) PCT Filed: Sep. 27, 2007

(86) PCT No.: PCT/US2007/079790
§ 371 (c)(1),
(2), (4) Date: Mar. 26, 2009

(87) PCT Pub. No.: WO2008/039953
PCT Pub. Date: Apr. 3, 2008

(65) Prior Publication Data
US 2010/0061428 A1   Mar. 11, 2010

Related U.S. Application Data

(60) Provisional application No. 60/847,714, filed on Sep. 27, 2006.

(51) Int. Cl.
*H04L 27/00* (2006.01)
(52) U.S. Cl. ........ 375/316; 375/219; 375/354; 375/355; 375/370
(58) Field of Classification Search ............ 375/316, 375/354, 355, 219, 370
See application file for complete search history.

(56) References Cited

U.S. PATENT DOCUMENTS

| | | | |
|---|---|---|---|
| 4,387,458 A * | 6/1983 | Carbrey | 370/431 |
| 4,449,119 A | 5/1984 | Hanna et al. | |
| 4,845,475 A * | 7/1989 | Cooledge et al. | 340/644 |
| 5,784,370 A * | 7/1998 | Rich | 370/395.1 |
| 6,452,927 B1 * | 9/2002 | Rich | 370/395.1 |
| 6,763,447 B2 | 7/2004 | Hersch et al. | |
| 2007/0237076 A1 * | 10/2007 | Balandin et al. | 370/229 |
| 2008/0063129 A1 * | 3/2008 | Voutilainen | 375/376 |

FOREIGN PATENT DOCUMENTS
EP   0112043 B1   6/1984

OTHER PUBLICATIONS

Storto, Marco, et al; "Time-Multiplexed Dual-Rail Protocol for Lowpower Delay-Insensitive Asynchronous Communication"; Power and Timing Modeling, Optimization and Simulation (PATMOS), Oct. 1998, p. 136; XP002475259.
IEEE; "IEEE STD 1394-1995", IEEE Standard 1394-1995; 1995; p. 32; XP002475297, USA.
McAuley, Anthony J.; "Four State Asynchronous Architectures"; IEEE Transactions on Computers, vol. 41, No. 2; Feb. 2, 1992; p. 129-142; XP002475258.

(Continued)

*Primary Examiner* — Kenneth Lam

(57) ABSTRACT

A mobile device that incorporates the MIPI D-PHY specification has data lanes for carrying data between electronic modules within the device. The data lanes may incorporate a spaced-one-hot approach for asynchronously receiving a data signal over a two-wire interface. A two-wire receive interface is provided that uses an exclusive-NOR to capture a timing signal along with a set-reset flip-flop which holds the state of the data line so that a D flip-flop that is clocked on the falling edge of the timing signal received from the exclusive-NOR gate can sample the data and provide an accurate asynchronous data output.

16 Claims, 3 Drawing Sheets

SAMPLING APPROACH - NEW CIRCUIT

OTHER PUBLICATIONS

Josephs, Mark B., et al; "Modeling and Design of Asynchronous Circuits"; Proceeding of the IEEE, vol. 87, No. 2' Feb. 1999; p. 234-242; XP002475260.

Molina, Pedro A., et al; "Quasi Delay-Insensitive Bus for Fully Asynchronous Sytems"; Circuits and Systems, 1996; ISCAS '96, 'Connecting the World'; 1996 IEEE International Symposium on, vol. 4, May 15, 1996; XP002475275.

Aghdasi, Farhad; "Asynchronous State Machine Synthesis Using Data Driven Clocks"; European Design Automation Conference; Congress Centrum Hamburg; Hamburg, DE; p. 9-14; 1993.

Agbdasi, Farhad; "Synthesis of Self-Clocked Asynchronous Controllers"; Synthesis and Optimization of Logic Systems, IEEE Colloquium on; March 14, 1994; p. 11/1-11/5.

* cited by examiner

SPACED ONE-HOT RECEIVER

TECHNICAL FIELD OF THE INVENTION

Embodiments of the invention are related to digital data receive circuits that receive data asynchronously. More particularly, embodiments of the invention may be related to the implementation of an MIPI receiver or transceiver that uses the D-PHY specification and implements a digital receive circuit that is capable of asynchronously receiving a series of spaced-one-hot pulses.

BACKGROUND OF THE INVENTION

Components inside a mobile device generally require high speed interfaces for communication interconnection. Traditionally, the interfaces between the components or modules within a mobile device are CMOS parallel busses operating at low bit rates with slow edges for EMI reasons. These interfaces have become outdated and require a significant extension of the interface bandwidths for the addition of more advanced applications to be incorporated into a mobile device. In order to accomplish this, the MIPI specification was established along with the D-PHY specification, which may be used in combination with the MIPI specification. These specifications may initially be used to provide standard specifications for the connection of a host processor, within a mobile device, to display and camera modules also within the mobile device. The hardware and software design of a mobile device that meets the specifications is up to the manufacturer.

The D-PHY specification may be used by manufacturers to aid with the design of products that adhere to the MIPI alliance specifications for mobile device host processors, display, and camera interfaces. Use of the D-PHY specification may aid in reducing the time-to-market and design costs of mobile devices by standardizing the interfaces between products from different manufacturers. In addition, richer feature sets requiring high bit rates can be realized by implementing the D-PHY standard. Additionally, new features can be added to most mobile devices in a more simplified fashion due to the extensible nature of the MIPI alliance specifications.

A PHY is a functional block that implements the features necessary to communicate over a lane interconnection. A PHY comprises a lane module configured as a clock lane and one or more lane modules configured as data lanes and a PHY adapter layer. A D-PHY is intended to communicate with a bit rate in the order of around 500 Mbits/sec (Mbps), hence the Roman numeral D for 500.

The PHY may use two wires per data lane plus two wires for the clock lane. A lane consists of two complementary lane modules communicating via two-line, point-to-point lane interconnects. Sometimes, a lane is used to denote an interconnect only. Since the PHY may use two wires per data lane plus two wires for the clock lane, there may be foil wires for a minimum PHY configuration. In high-speed mode, each lane is terminated on both sides and driven by a low-swing, differential signal. In low-power mode, all the wires are operated single-ended and non-terminated. For EMI reasons, the drivers for the low power mode are slew-rate controlled and current limited. In certain modes, data is sent over a lane using two wires and having data incorporating a spaced-one-hot approach. A spaced-one-hot approach is a technique for asynchronously sending signal data over a two-wire interface. In a spaced-one-hot approach, two wires are used together to communicate data asynchronously. There are four states defined for the two wires, 0 0 (space), 0 1 (mark-0), 1 0 (mark-1), and 1 1 (stop). The stop state is not for use during normal transmission. All transmissions over the two-wire interface are "Gray" coded so that only one line ever changes at a time. To send a zero bit, the transmitter sends a mark-0 followed by space. To send a one bit, the transmitter sends mark-1 followed by space. So, for example, the pattern 0 1 0 0 1 0 1 1 would look like the sequence shown in FIG. 1.

The lane or the two-wire interface lines (Line 0, Line 1) can pause in any state as shown by the breaks 10 in the timing diagram of FIG. 1. The receiver 14, which receives the data on the line, is expected to recover a clock 12 by generating an exclusive-OR of the two lines (Line 0, Line 1). FIG. 2 depicts a prior art approach to sampling a spaced-one-hot type asynchronous signal that is being received by a prior art digital receiver circuit 14 from two lines 16, 18. The two lines each go to an exclusive-OR component 20 where an exclusive-OR of the two lines is generated at 22. This exclusive-OR result 22 is appropriately delayed by a delay device 24 and then is used to clock the flip-flop 26 and sample the data lines 16, 18 via the flip-flop 26 to determine the identity of the transmitted bit. The rising edge 13 of the clock signal 12 is used as the trigger for the D-flip-flop and output it as the sampled value 28.

The primary disadvantage of the prior art receive circuit, shown in FIG. 2, is that there is a delay element required for delaying the clock signal 22 to the flip-flop 26. This delay element 24 must provide a signal delay that is long enough to ensure that the data will be valid at the D-input 30 of the flip-flop 26 with sufficient set-up time. But, if the delay is too long, the speed of the data link becomes limited by the lengthy delay. Building a reliable delay with these required specifications in digital logic is a tricky endeavor and may require a custom layout element in the silicon/integrated circuit device.

What is needed is an approach for receiving a spaced-one-hot asynchronous signal data over a two-wire interface that does not require a delay element.

SUMMARY OF THE INVENTION

The present invention disclosed and claimed herein, in one aspect thereof, comprises a data receive circuit that has a set-reset flip-flop for receiving a spaced-one-hot asynchronous data signal from a two-wire data line. The set-reset flip-flop outputs and holds the output. At the same time, an exclusive-NOR receives the same spaced-one-hot asynchronous data signal and outputs a timing signal. There is also included a flip-flop for receiving the held output and the timing signal. The flip-flop outputs an output data signal. The flip-flop may be a D-flip-flop. Also, the flip-flop is set to be clocked on the rising edge of the timing signal which is generated by the falling edge of a line signal.

Embodiments of the data receive circuit are intended to operate at a bit rate between 5 to 1000 Mbps. Also, embodiments of the invention may be used in a mobile device as a receiving portion of the data interfaces within the mobile device. Such data interfaces may be for a display circuit module, a camera module, a host microprocessor module and various other modules that can be incorporated into a mobile device.

Some embodiments of the invention may be incorporated into a data receive circuit that is part of an MIPI receiver or transceiver in accordance with the D-PHY specification. As such, the data receive circuit may receive a two-wire data lane that has Gray coded data transitions. Another embodiment of an invention may be an electronic device that has a processing circuit and other circuit modules contained therein. One or more of the circuit modules may include a data receiving circuit that receives data from the processor circuit. The data being received may be spaced-one-hot asynchronous signal data that originates from another circuit module or the processor circuit. The data receiving circuit may comprise a set-reset flip-flop for receiving the spaced-one-hot asynchronous signal data from a two-wire data line. The set-reset flip-flop may output a held output. The data receiving circuit may also comprise an exclusive-NOR for receiving the spaced-one-hot asynchronous signal data and for providing a timing signal derived there from. The exemplary electronic device's data receiving circuit may also include a flip-flop that receives both the held output from the set-reset flip-flop as well as the timing signal from the exclusive-NOR. The flip-flop will thus output a first data following the falling edge of the line signal.

These and other embodiments of the present invention utilize a data receiving circuit that receives a spaced-one-hot asynchronous signal and provides a clock data signal there from without the use of a delay component, a feedback signal, or data having varied widths to aid in the creation of the timing signal. These summarized embodiments of the invention are not intended to limit the scope of the following claims or be exhaustive of the various potential embodiments of the invention.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE EXEMPLARY EMBODIMENTS OF THE INVENTION

Figure 1:
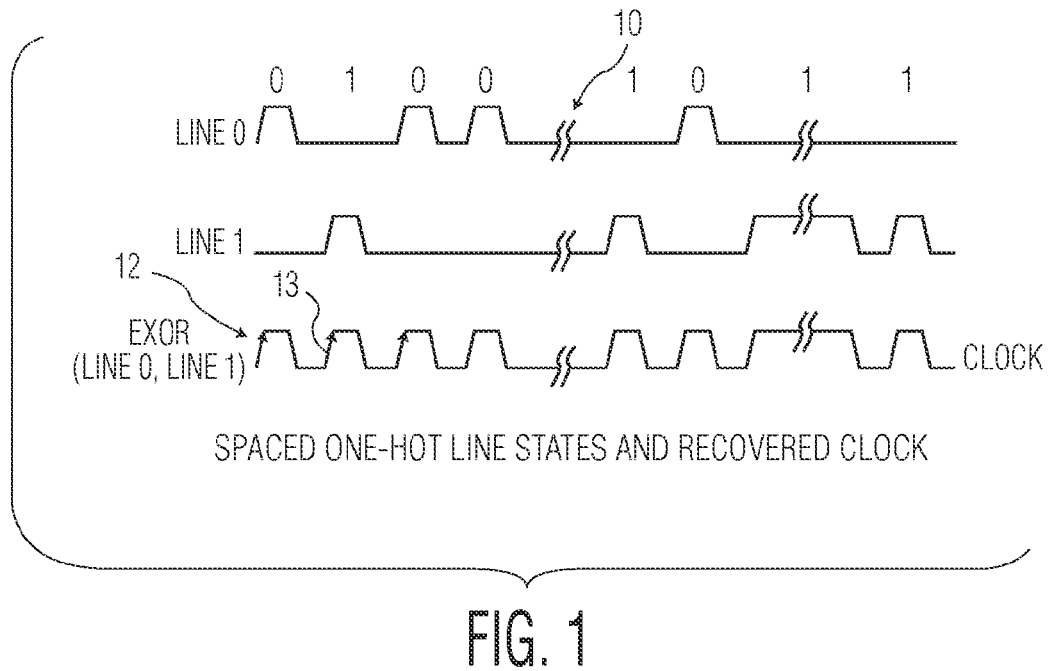
FIG. 1 illustrates a timing diagram of prior art spaced-one-hot line states as well as the recovered clock signal.
Figure 2:
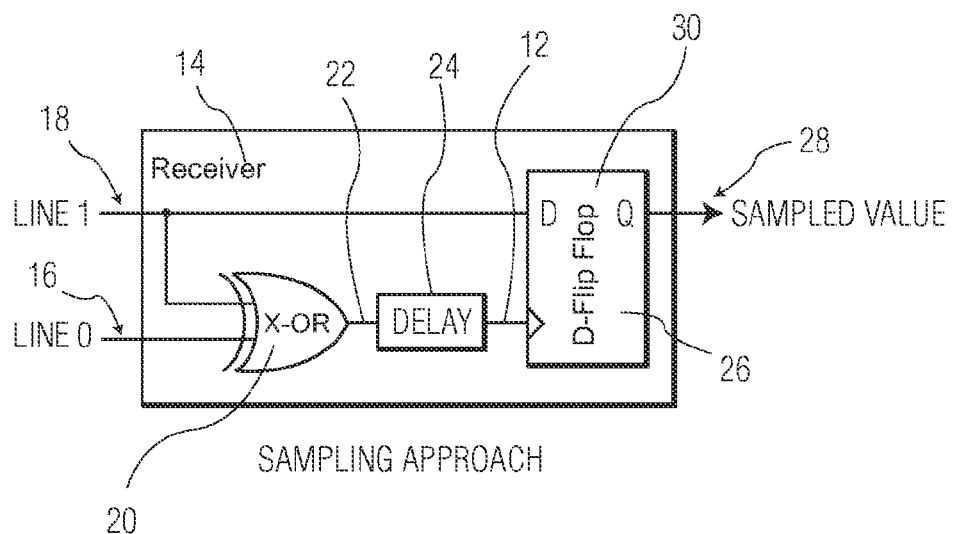
FIG. 2 illustrates a prior art receiver sampling approach for receiving a spaced-one-hot asynchronous signal that recovers a clock signal.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

As discussed above, a spaced-one-hot approach to asynchronously signal data over a two-wire interface uses two wires for a lane. The two wires are used together to communicate the data asynchronously. There are four states defined for the two wires. A space state (0 0), a mark-0 state (0 1), a mark-1 state (1 0), and a stop state (1 1). All the transitions over the two-wire interface are Gray coded so that only one line changes states at a time. To set a zero bit, the transmitter sends a mark-0 state (0 1) followed by a space (0 0). To send a one bit, the transmitter sends a mark-1 state (1 0) followed by a space (0 0).

The actual maximum achievable bit rate over a lane is generally determined by the performance of the transmitter, receiver and interconnect implementations. However, embodiments of the invention are intended to operate for a bit rate range of 5 to 1,000 Mbps per lane. It's anticipated that a typical implementation of an embodiment of the invention will have a low power mode bit rate of approximately 10 Mbps per lane.

Figure 3:
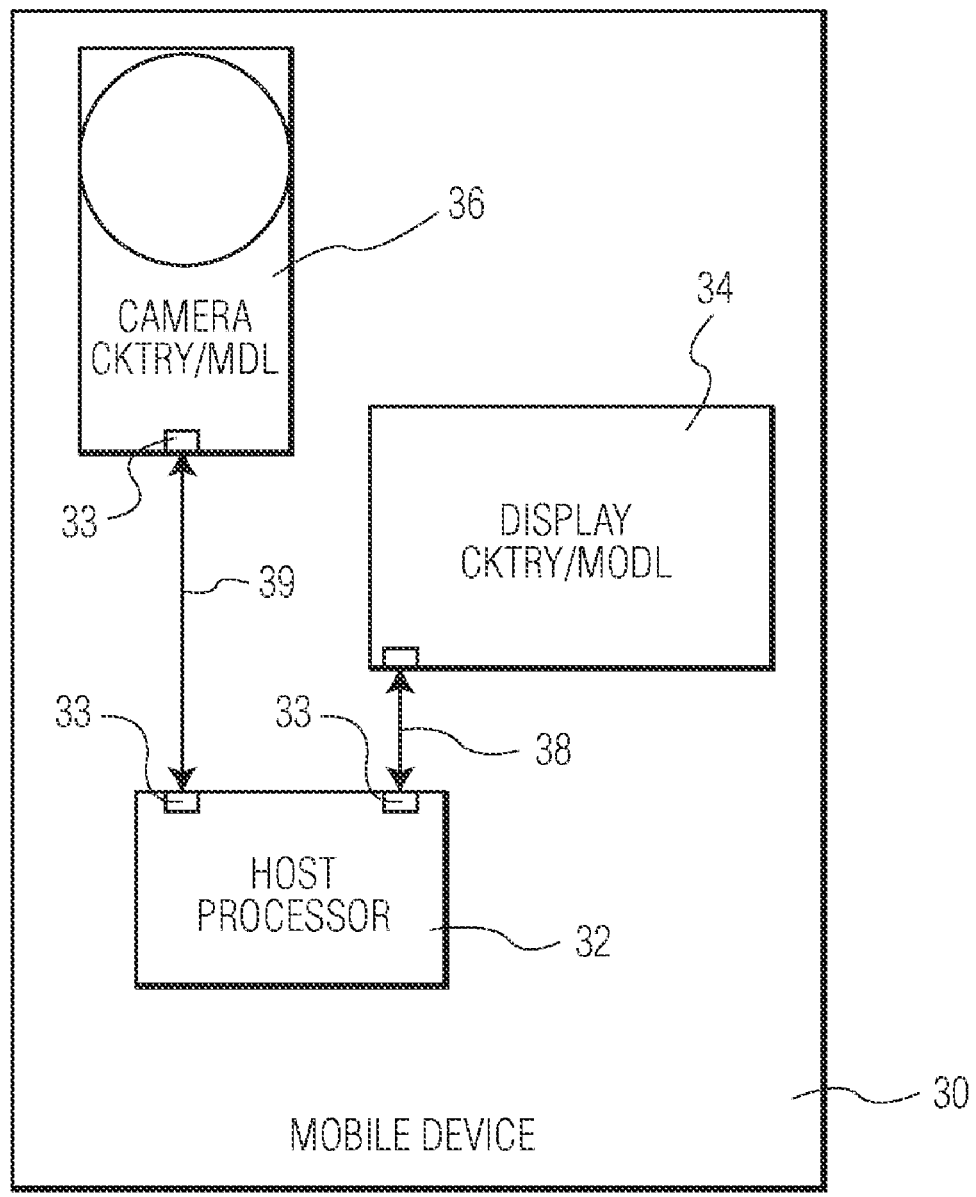
FIG. 3 illustrates an exemplary mobile device that comprises a receiver in accordance with embodiments of the present invention.

Referring now to FIG. 3, an exemplary mobile device 30 is depicted having a host processor 32. The host processor is in communication with the display circuitry module 34. The host processor is also in electronic communication with the camera circuitry module 36. The communication connection 38, between the host processor and the display circuitry 34, may incorporate an embodiment of the invention at either end of the data line 38. In particular, the embodiment of this invention can be applied to the implementation of an MIPI receiver or transceiver that uses the D-PHY specification. Such a receiver or transceiver could be located at either end of data line 38. Furthermore, data line 39, which is between the host processor 32 and the camera circuitry 36, may also implement an embodiment of the present invention. It is understood that embodiments of the invention would not be limited to a mobile device 30, but could be used in substantially any electronic device wherein the high speed, low power, low cost PHY would be useful. For example, embodiments of the invention could be used in a dual-simplex configuration for interconnections in a more generic communication network.

Figure 4:
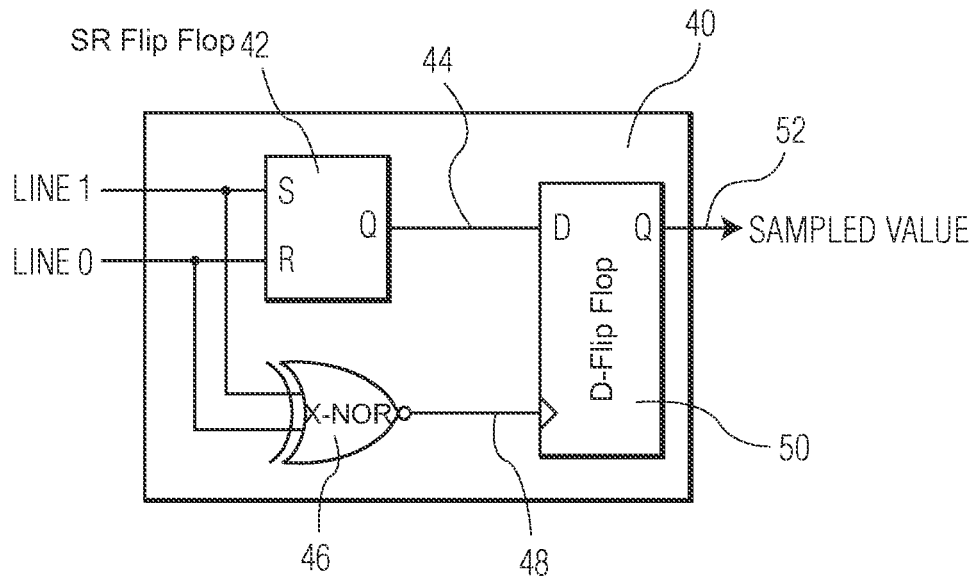
FIG. 4 illustrates an exemplary sampling approach in a receiver in accordance with an embodiment of the present invention.

Referring now to FIG. 4, an embodiment of the invention in the form of a circuit design 40 is depicted. The exemplary approach involves using a set reset flip-flop 42 to hold the state of the Q output 44. An exclusive-NOR 46 (instead of an exclusive-OR) works together with the set-reset flip-flop 42 to capture the state of the input lines 0 and 1. The exclusive-NOR's output 48 is the clock signal which is captured from the line 1 and line 0 inputs. The capture point is at the rising edge 54 of each clock pulse 48, which follows the falling edge of the line signal rather than the rising edge of the line signal, but this is completely acceptable. Since the receive circuit 40 is asynchronous, there is no expectation that data on line 1 and 0 should appear at any specific or given time.

The exclusive-NOR output 48 is used to sample the output of the set-reset flip-flop 44 using the D flip-flop 50 and to determine the received bit, which is then output as the sample value 52.

There is no feedback from the D flip-flop 50 to the set-reset flip-flop 42. Furthermore, the D flip-flop is clocked on the rising edge 54 of the exclusive-NOR's output 48.

An essential feature of embodiments of the present invention is that no delay device is used in the receiving circuit 40 to aid in capturing the state of the lines (Line 0, Line 1). By not including the delay component in the circuit, production of an exemplary receiver circuit in silicon is much easier, less expensive and does not require a custom layout element (that would be required if a delay component was incorporated therein). Embodiments of the present invention operate at the rate of the data flow on the data lane. As such, embodiments of the present invention provide a method and circuit to implement a digital receive circuit that is capable of asynchronously receiving a series of spaced-one-hot pulses without the use of added delay elements. The exemplary embodiments provide a high-speed, low power, low cost PHY that is especially suited for mobile applications as well as other data received applications.

Figure 5:
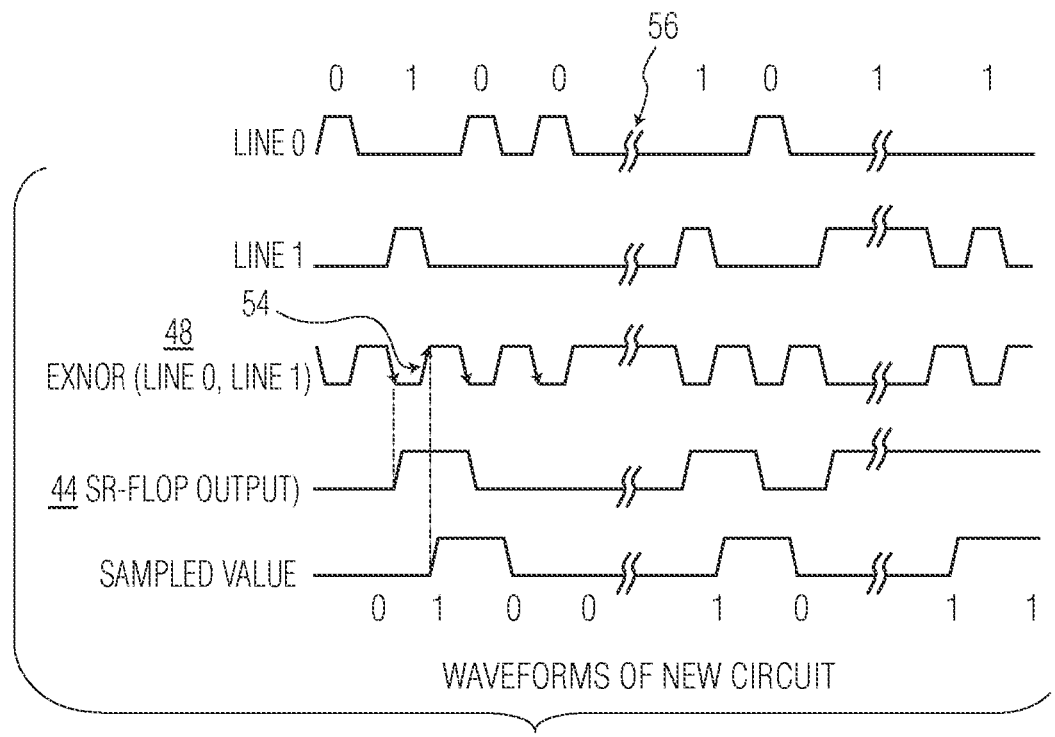
FIG. 5 depicts the wave form and timing diagram of the exemplary sampling approach shown in FIG. 4.

It will be appreciated by those skilled in the art having the benefit of this disclosure that this invention provides a digital circuit capable of asynchronously receiving a series of spaced-one-hot pulses without the use of delay elements, feedback elements or pulses having a variety of widths. Embodiments of the present invention also can pause in any state, as shown by the line breaks 56 in the wave forms in FIG. 5. The exemplary receiver 40 recovers a timing signal as is shown in FIG. 5 by the exclusive-NOR output 48. The D flip-flop 50 samples the output 44 of the set-reset flip-flop 42 on the rising edge 54 of the exclusive-NOR's output 48. As such, the asynchronous series of spaced-one-hot pulses that are received on lines 0 and 1 are properly interpreted by the exemplary receive circuitry 40 such that a sample value output 52 is the data that was intended to be received. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the inventive elements and scope of this invention, as defined by the following claims. Thus, it is intended that the following claims be interpreted to embrace all such further modifications, changes, rearrangements, substitutions, alternatives, design choices, and embodiments.

The invention claimed is:

1. A data receive circuit comprising:
a set-reset flip-flop for receiving a spaced-one-hot asynchronous data signal from a two-wire data line and for transmitting a held output;
an exclusive-nor for receiving said spaced-one-hot asynchronous data signal and for transmitting a timing signal; and
a flip-flop for receiving said held output and said timing signal, wherein said flip-flop output is an output data signal.

2. The data receive circuit of claim 1, wherein said flip-flop is a D flip-flop.

3. The data receive circuit of claim 1, wherein said flip-flop is clocked on a rising edge of said timing signal.

4. The data receive circuit of claim 1, wherein said spaced-one-hot asynchronous data has a bit rate between 5 to 1000 Mbps.

5. The data receive circuit of claim 1, wherein said data receive circuit is incorporated into a mobile device.

6. The data receive circuit of claim 1, wherein said data receive circuit is part of a MIPI receiver or a transceiver in accordance with a D-PHY specification.

7. The data receive circuit of claim 1, wherein said two-wire data line has Gray coded transitions.

8. An electronic device comprising:
a processor circuit for receiving first data originating from a circuit module in said electronic device;
a data receiving circuit for transmitting said first data to said processor circuit and receiving a spaced-one-hot asynchronous signal data originating from said circuit module wherein said data receiving circuit includes a set-reset flip-flop for receiving said spaced-one-hot asynchronous signal data from a two-wire data line and for transmitting a held output; an exclusive-nor for receiving said spaced-one-hot asynchronous signal data and for transmitting a timing signal; and a flip-flop for receiving said held output and said timing signal, wherein said flip-flop output is said first data.

9. The electronic device of claim 8, wherein said circuit module is a digital camera circuit.

10. The electronic device of claim 8, wherein said circuit module is a display device.

11. The electronic device of claim 8, wherein said electronic device is a mobile device.

12. A method of receiving, by at least one processor and a display circuit module, a spaced-one-hot asynchronous signal data from a two-wire data line comprising:
recovering a timing signal from said spaced-one-hot asynchronous signal data using an exclusive-nor;
holding a state of said spaced-one-hot asynchronous signal data using a set-reset flip flop; and
reading said held state of said spaced-one-hot asynchronous signal data using said timing signal as a clock signal by a flip-flop; and
transmitting an output data signal.

13. The method of claim 12, wherein reading said held state of said spaced-one-hot asynchronous signal data using said timing signal as said clock signal by said flip-flop is done on a rising edge of said timing signal.

14. The method of claim 12, wherein said spaced-one-hot asynchronous signal data has a bit rate between 5 and 1000 Mbps.

15. The method of claim 12, wherein said at least one processor and display circuit module-are in a mobile device.

16. The method of claim 15, wherein said mobile device is in accordance with a MIPI D-PHY specification.

* * * * *